United States Patent
Sharma et al.

(10) Patent No.: US 10,353,950 B2
(45) Date of Patent: Jul. 16, 2019

(54) VISUAL RECOGNITION USING USER TAP LOCATIONS

(71) Applicant: Google LLC, Mountain View, CA (US)

(72) Inventors: Abhanshu Sharma, Zurich (CH); David Petrou, Brooklyn, NY (US); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 201 days.

(21) Appl. No.: 15/195,369

(22) Filed: Jun. 28, 2016

(65) Prior Publication Data
US 2017/0371898 A1 Dec. 28, 2017

(51) Int. Cl.
*G06F 16/58* (2019.01)
*G06F 3/0484* (2013.01)
*G06F 3/0488* (2013.01)
*G06F 16/903* (2019.01)

(52) U.S. Cl.
CPC ...... *G06F 16/5866* (2019.01); *G06F 3/04842* (2013.01); *G06F 3/04883* (2013.01); *G06F 16/90335* (2019.01); *G06K 2209/01* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 8,774,527 B1 | 7/2014 | Anguelov et al. | |
| 2011/0125735 A1* | 5/2011 | Petrou | G06F 17/30256 707/723 |
| 2011/0135207 A1 | 6/2011 | Flynn et al. | |
| 2013/0156275 A1* | 6/2013 | Amacker | G06K 9/00677 382/118 |
| 2014/0314319 A1* | 10/2014 | Hamel | G06K 9/344 382/176 |
| 2015/0052431 A1* | 2/2015 | Zhu | G06K 9/00671 715/716 |
| 2016/0011737 A1* | 1/2016 | Kang | G06F 3/0488 715/808 |
| 2016/0203525 A1* | 7/2016 | Hara | G06Q 30/0271 705/14.56 |
| 2017/0052982 A1* | 2/2017 | Sirven | G06F 16/5866 |
| 2017/0249339 A1* | 8/2017 | Lester | G06F 17/30256 |

OTHER PUBLICATIONS

Bhonge, "VisualRank to Large-Scale Image Retrieval," International Journal of Advanced Engineering Research and Studies, Research Paper, pp. 137-142, Apr.-Jun. 2012.
Jansen et al., "Determining the User Intent of Web Search Engine Queries," WWW 2007, Poster Paper, pp. 1149-1150, May 2007.

(Continued)

*Primary Examiner* — Christopher J Fibbi
(74) *Attorney, Agent, or Firm* — Fish & Richardson P.C.

(57) ABSTRACT

Methods, systems, and apparatus for receiving a query image and a user tap location, processing the received query image based on the user tap location, identifying one or more entities associated with the processed query image and in response to receiving (i) the query image, and (ii) the user tap location, providing information about the identified one or more of the entities.

17 Claims, 4 Drawing Sheets

(56) References Cited

OTHER PUBLICATIONS

Tang et al., "IntentSearch: Capturing User Intention for One-Click Internet Image Search," IEEE Transactions on Pattern Analysis and Machine Intelligence, 34(7):1342-1353, Jul. 2012.
Tian et al., "Active Reranking for Web Image Search," IEEE Transactions on Image Processing, 19(3):805-820, Mar. 2010.
International Search Report and Written Opinion in International Application No. PCT/US2016/065736, dated Mar. 6, 2017, 11 pages.
Gui et al. "Web image retrieval via learning semantics of query image," 2009 International Conference on Multimedia and Expo, Piscataway, NJ, Jun. 28, 2009, 4 pages.
Written Opinion issued in International Application No. PCT/US2016/065736 dated Jun. 5, 2018, 5 pages.
International Preliminary Report on Patentability issued in International Application No. PCT/US2016/065736, dated Jan. 10, 2019, 7 pages.

\* cited by examiner

VISUAL RECOGNITION USING USER TAP LOCATIONS

TECHNICAL FIELD

This specification relates to search engines.

BACKGROUND

In general, a user can request information by inputting a query to a search engine. The search engine can process the query and can provide information for output to the user in response to the query.

SUMMARY

A system can receive a query image and a user tap location, e.g., a photograph from a user's surroundings with a selected area of interest. In response to receiving the query image and user tap location, the system applies visual recognition techniques to the received query image to identify one or more entities in the received query image. The visual recognition results are improved by using the user tap location. For example, visual recognition results may be used to enhance inputs to backend recognizers and may be used to rank obtained recognition results. The system provides information about one or more of the identified entities in response to receiving the query image and user tap location.

Innovative aspects of the subject matter described in this specification may be embodied in methods that include the actions of receiving (i) a query image, and (ii) a user tap location; processing the received query image based on the user tap location; identifying one or more entities associated with the processed query image; and in response to receiving (i) the query image, and (ii) the user tap location, providing information about the identified one or more of the entities.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations generating a respective relevance score for each of the candidate search queries comprises, for each candidate search query: determining whether a context of the query image matches the candidate search query; and based on the determined match, generating a respective relevance score for the candidate search query.

In some implementations processing the received query image based on the user tap location comprises cropping the received query image based on the user tap location.

In some implementations cropping the received query image comprises one or more of (i) performing a content aware cropping algorithm, (ii) processing the query image using an object detection neural network, (iii) applying a fixed size crop around the user tap location, and (iv) applying multiple crops.

In some cases identifying one or more entities associated with the processed query image comprises: processing the processed query image using a neural network to classify one or more entities in the processed query image.

In some implementations the method further comprises processing the received query image using a neural network to classify one or more entities in the received query image; and combining the (i) classified one or more entities in the processed query image, and (ii) classified one or more entities in the received query image.

In some cases combining the (i) classified one or more entities in the processed query image, and (ii) classified one or more entities in the received query image comprises using the classified one or more entities in the received query image to contextualize the classified one or more entities in the processed query image.

In other implementations processing the received query image based on the user tap location comprises processing the received query image using an optical character recognition engine to detect one or more areas of text In some cases the method further comprises selecting an area around the user tap location.

In some cases identifying one or more entities associated with the processed query image comprises: processing the selected area using a first optical character recognition engine to identify a first number of entities; processing the remaining text in the processed query image using a second optical character recognition engine to identify a second number of entities, wherein processing text using the second optical character recognition engine is computationally less expensive than processing text using the first optical character recognition engine.

In some implementations processing the received query image based on the user tap location comprises defining an area of interest around the user tap location.

In some implementations identifying one or more entities associated with the processed query image comprises processing the processed query image using a descriptor matching engine to identify one or more entities.

In other implementations processing the processed query image using a descriptor matching engine comprises extracting a higher density of descriptors in the defined area of interest compared to other areas in the processed query image.

In further implementations providing information about the identified one or more entities comprises providing a representative search query for output in response to receiving (i) the query image, and (ii) the user tap location.

In some cases providing a representative search query for output in response to receiving (i) the query image, and (ii) the user tap location comprises: identifying, for one or more of the identified entities associated with the processed query image, one or more candidate search queries that are pre-associated with the one or more entities; generating a respective relevance score for each of the candidate search queries; and selecting, as a representative search query for the query image, a particular candidate search query based at least on the generated respective relevance scores.

In some implementations generating a respective relevance score for each of the candidate search queries comprises generating a respective relevance score for each of the candidate search queries based on a proximity of the one or more entities that are pre-associated with the candidate search query to the user tap location.

In some cases generating a respective relevance score for each of the candidate search queries based on a proximity of the one or more entities that are pre-associated with the candidate search query to the user tap location comprises: defining a bounding box around each identified one or more entities that are associated with the processed query image; determining that the user tap location lies within one or more bounding boxes of one or more respective entities; assigning a higher relevance score to the one or more candidate search queries that are pre-associated with the one or more respective entities than other candidate search queries.

In some implementations each generated respective relevance score for each of the candidate search queries is based on one or more of (i) result confidence, (ii) query popularity, (iii) a topicality of the candidate search query, or (iv) a measure indicative of how interesting and useful a search results page associated with the candidate search query is.

In other implementations identifying one or more entities associated with the processed query image comprises: processing the received query image using a first classifier to identify one or more entities in the received query image; processing the processed query image using a second classifier to identify one or more entities in the processed query image, wherein the second classifier has a higher processing power than the first classifier.

The subject matter described in this specification can be implemented in particular embodiments so as to realize one or more of the following advantages.

Image recognition systems and procedures can be computationally expensive, since effectively recognizing objects or text in images may involve searching through large databases of descriptors, or processing an image using a deep neural network, e.g., a convolutional neural network. Furthermore, image recognition systems often have limited resources.

A system implementing visual recognition using user tap locations, as described in this specification, allows visual recognition engines to effectively apply visual recognition resources, such as neural networks or other image classification components, to areas of an image that a user is interested in. The system allocates and applies more processing power to an area of an image that a user has indicated as being important or interesting, whilst allocating and applying less processing power to other areas of the image. The system may therefore achieve higher quality recognition in the area of the image that the user has indicated as being important or interesting. Furthermore, the computational resources and time required by the visual recognition system may be reduced, since the system is not required to apply high processing power to complete images. In addition, the system may achieve higher levels of accuracy when answering user queries since the system is able to filter out irrelevant objects from a query image and analyze objects that are relevant to the user query.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for providing information, e.g., suggested search queries, based on image-based queries. When performing a visual search, a user of a user device may open a camera viewfinder or photo from an on-device gallery to select an input query image. The user may tap on an area of interest in the input image. The location of the user tap may be sent with the input query image as part of an image search request to a system A system can receive the input query image and user tap location and process the received input query image based on the received user tap location to generate a processed query image. The system may identify one or more entities associated with the processed query image and provide information biased towards one or more entities that are in a close proximity to the user tap location.

Figure 1:
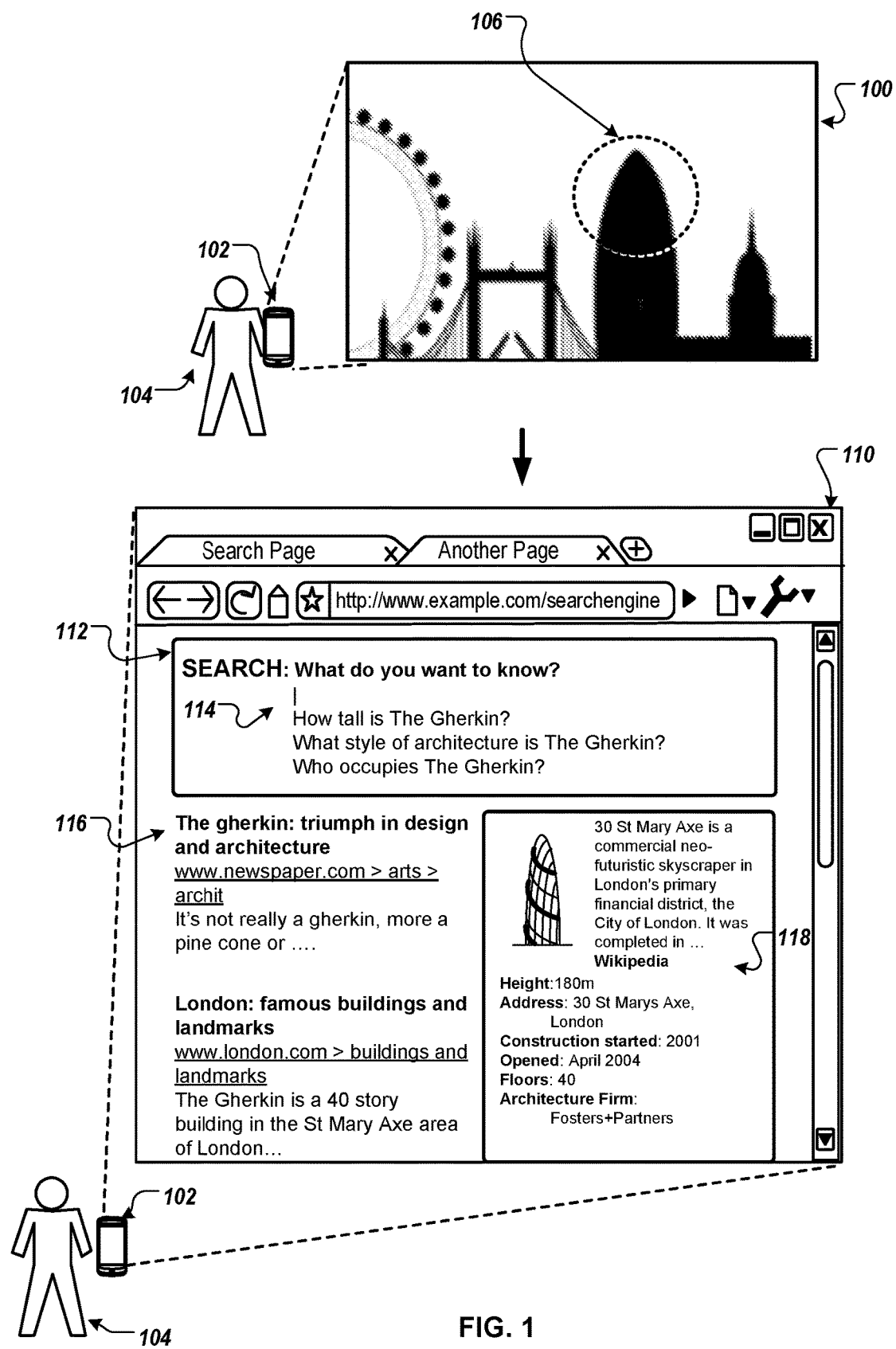
FIG. 1 depicts an example query image and an example search results page for the example query image.

FIG. 1 depicts an example query image 100, example user tap location 106 and an example search results page 110 for the example query image 100 and example user tap location 106. For example, the example search results page 110 may be provided by a system in response to receiving and processing example query image 100 and user tap location 106.

The example query image 100 depicted in FIG. 1 is a representative photograph query image. For example, the example query image 100 may represent a photograph taken by a user 104 using a user device 102. In other examples the example query image 100 may represent a photograph received or otherwise accessed by a user 104 at the user device 102. In some implementations the example query image 100 may represent another type of image received, obtained or accessed by a user 104 at the user device 102. For example, the image may represent a thumbnail or other image found on a website accessed by the user device 102, or an image obtained from an application running on the user device 102.

The example query image 100 may include one or more image features. The one or more image features include image features or entities that may be identified by an image recognition system. For example, in the example query image 100 depicted in FIG. 1, one or more image features includes "buildings," "cityscape," "The Gherkin," "Tower Bridge" or "The London Eye." Other image features may include other objects or entities, such as trees, cars, a body of water, or people. In some cases the example query image 100 may include portions of text, e.g., as a street sign name or text in a poster, that may be identified by the image recognition system.

The example user tap location 106 includes an area of the example query image 100 that has been selected by user 104 of the user device 102. For example, the user device 102 may include a touchscreen device, e.g., a smart phone, and the user tap location 106 may represent an area that the user has tapped or selected to indicate a particular interest in the area. In some cases the user tap location 106 may be defined by coordinates (x,y) representing a center of a user tap. In other cases the user tap location 106 may be defined by another form of context that indicates location, e.g., manually input coordinates. As depicted in FIG. 1, the user 102 has tapped on or selected an area 106 focused on "The Gherkin."

The example query image 100 and user tap location 106 may be received by user device 102 and processed using a system for providing information for output in response to receiving a query image and user tap location, e.g., system 200 below in FIG. 2, to provide information about one or more entities identified in the query image for output. The information about the one or more entities identified in the query image may be biased towards entities identified in the query image as being in close proximity to the user tap location 106.

As depicted in FIG. 1, the information about one or more entities identified in the query image includes an example search results page 110 including a search box 112, multiple example representative search queries 114, search results pertaining to an entity identified in the query image 116 and a knowledge card 118. The example search results page 110 is representative only, and information provided about one or more entities identified in the query image for output may include a smaller or larger amount of information taking various representations.

The example search results page 110 includes a search box 112 in which a user may enter a search query. The search box may be configured to receive search queries input directly from a user, or may be configured to provide one or more representative search queries in response to receiving a search query image and user tap location, e.g., query image 100 and user tap location 106. As depicted in FIG. 1, the search box includes three representative search queries "How tall is the Gherkin?" "What style of architecture is The Gherkin?" and "Who occupies The Gherkin?" relating to the entity "The Gherkin" that was determined to be an entity that is in close proximity to the user tap location 106.

The example search results page 110 further includes a list of search results 116 and a knowledge card 118. The knowledge card 118 provides general information relating to the entity "The Gherkin," such as the size, age and address of the building. The knowledge card has been provided for display in example search results page 110, for example in response to identifying the entity "The Gherkin" as being in close proximity to the user tap location 106 of the query image 100. The list of search results 116 provides search results responsive to the representative search query "The Gherkin." Providing information about one or more entities associated with a query image in response to receiving a query image and user tap location is described in more detail below with reference to FIGS. 2, 3 and 4.

Figure 2:
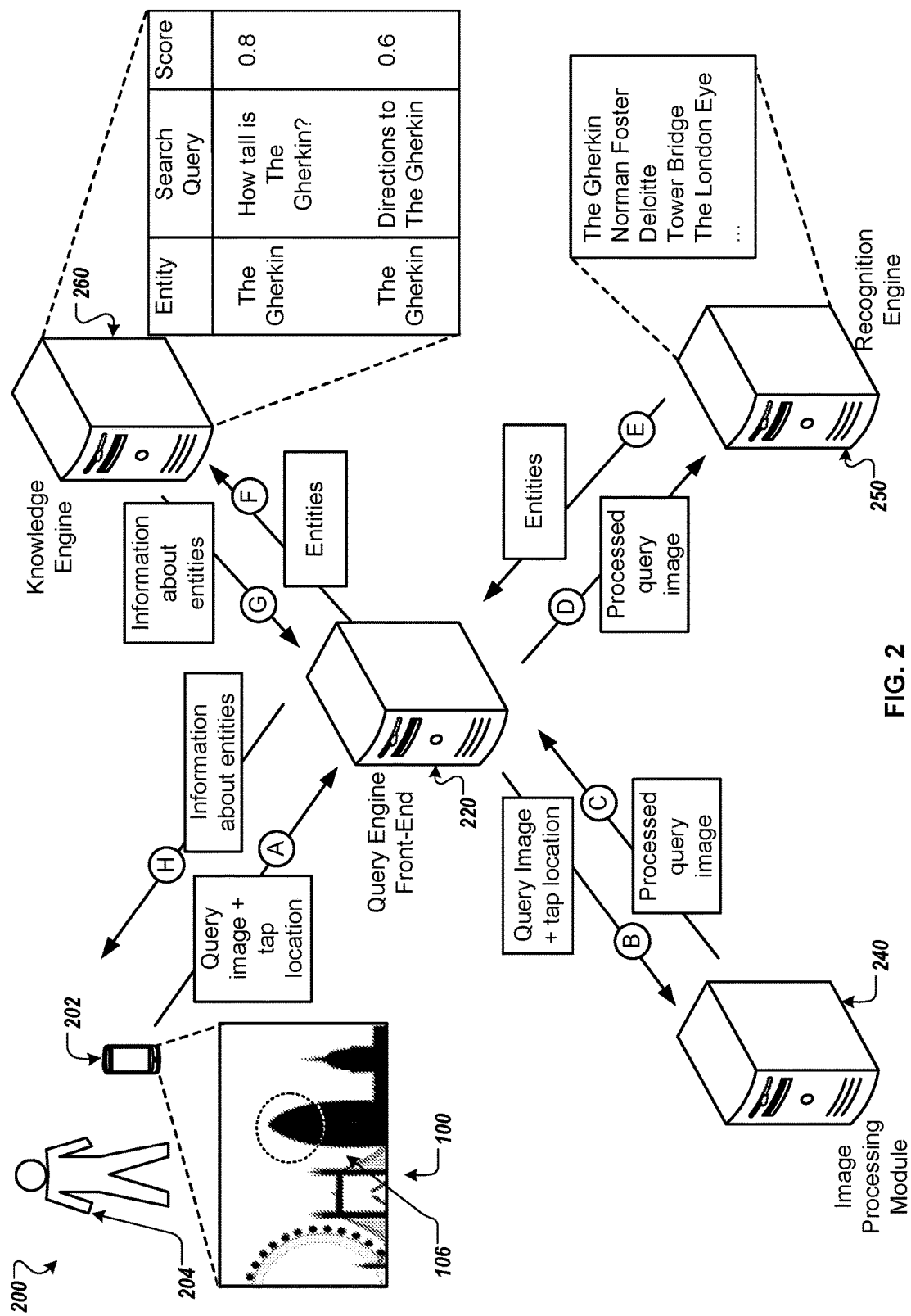
FIG. 2 depicts an example system for providing information about one or more entities for output in response to receiving a query image and user tap location.

FIG. 2 depicts a system 200 for providing information about one or more entities for output in response to receiving a query image and user tap location. Briefly, the system 200 can receive a query image, such as photograph taken by a user, and a user tap location. The system 200 can process the received query image and identify one or more entities associated with the processed query image. The system can provide information about the identified one or more entities associated with the processed query image as output to the user.

The system 200 includes a user device 202, query engine front-end 220, an image processing module 240, a recognition engine 250 and a knowledge engine 260. In some cases one or more components of the system 200 may be included in the user device 202. In some cases the components of the system 200 can each be in communication over one or more networks, such as one or more LAN or WAN, or can be in communication through one or more other wired or wireless connections.

During operation (A), the query engine front-end 220 receives data encoding a query image and a user tap location input by the user. For example, the user 204 can provide a photograph, e.g., photograph 100, as a query image at the user device 202 together with a user tap location, e.g., user tap location 106. The user tap location may include coordinates of a location as specified by the user, e.g., specified by a finger tap on a screen of the user device or specified by other means. Data encoding the query image and user tap location can be received by the query engine front-end 220. In some implementations, the query engine front-end 220 can receive the data encoding the user-input query image and user tap location over one or more networks, or over one or more other wireless or wired connections.

The user device 202 can be a mobile computing device, such as a mobile phone, smart phone, personal digital assistant (PDA), music player, e-book reader, tablet computer, a wearable computing device, laptop computer, desktop computer, or other portable or stationary computing device. The user device 202 can feature a microphone, keyboard, touchscreen, or other interface that enables the user 204 to input a query at the device and to specify a tap location. For example, the user device may be a touchscreen smartphone configured to detect a user's tap position. In some implementations, the user 204 can provide the query at an interface that is presented or accessible from the user device 202. For example, the user 204 can enter the query at a search engine that is accessible at the user device 202, at a database that is accessible at the user device 202, or can provide the query and tap location at any other interface that features search capabilities, e.g., at a social network interface. The user 204 can provide a query at the user device 202 by selecting or submitting an image that the user would like to search for, or by providing a video sample of content that a user would like to search for.

Data that represents the query image and tap location input by the user 204 can be received by the query engine front-end 220 in a single data packet or in multiple data packets. The data can further be received simultaneously, or can be received separately at different times.

In some implementations the data representing the query image may include data representing a portion of the query image around the user tap location and data representing a remaining portion of the query image. For example, the user device 202 may be configured to send data representing a portion of the query image around the user tap location at a high resolution and data representing a remaining portion of the query image at a lower resolution.

Based on receiving the data encoding the query image and tap location input by the user, the query engine front-end 220 can transmit the data to the image processing module 240. During operation (B), the image processing module 240 can receive the data representing the user-input query image and tap location and process the user-input query image based on the user tap location to generate a processed query image.

The image processing module 240 may process received query images based on the user tap location in order to enhance inputs to the recognition engine 250, e.g., to improve recognition results obtained by recognition engine 250. In some implementations the image processing module 240 may be configured to crop received query images based on a user tap location. For example, the image processing module 240 may receive data representing photograph 100 and tap location 106. The image processing module 240 may then process the photograph 100 by cropping the photograph 100 based on the user tap location 106 using the cropping engine. In some implementations the image processing module 240 may include a content aware cropping algorithm and may crop a received query image by performing the content aware cropping algorithm on the query image. In some implementations the image processing module 240 may include an object detection neural network and may process the query image using the object detection neural network to generate a cropped received query image. In some implementations the image processing module 240 may be configured to apply a fixed size crop to a received query image around the user tap location, for example the image processing module 240 may apply a fixed size crop the photograph 100 around the user tap location 106, resulting in an image including most or all of the building "The Gherkin." In further implementations the system may apply multiple crops around the user tap location. For example, the system may process the query image using an object detection neural network that identifies multiple objects in the query image and may crop the image around each identified object to generate multiple cropped images.

In some implementations the image processing module 240 may include multiple optical character recognition (OCR) engines, e.g., multiple neural networks or other classifiers. The image processing module 240 may use the OCR engines to process a received query image by running one or more of the engines on the query image to detect one or more areas of text in the received query image, e.g., one or more lines of text. For example, the image processing module 240 may detect one or more lines of text, select an area of text around the user tap location, e.g., an area of fixed size, and process the selected area using a first OCR engine to identify a first portion of text in the query image. The image processing module 240 may further process remaining text in the processed query image using a second OCR engine. In some implementations the OCR engines may have different processing powers. For example, the second OCR engine may be computationally less expensive to run than the first OCR engine, e.g., the second OCR engine may include a shallower neural network than the first OCR engine.

In some implementations the image processing module 240 may be configured to process a received query image based on the user tap location by defining an area of interest around the user tap location. For example, the image processing module 240 may define an area of interest in the photograph 100 around the user tap location 106, resulting in a defined area of interest that includes most or all of the building "The Gherkin."

During operation (C), the image processing module 240 can transmit data representing the processed query image to the query engine front-end 220, which in turn may transmit the data to the recognition engine 250. During operation (D), the recognition engine 250 can receive the data representing the processed query image and can recognize one or more entities associated with the processed query image.

For example, in some implementations the recognition engine 250 can receive data representing a processed query image that includes a query image that has been cropped based on a user tap location. In these cases, the recognition engine 250 can identify one or more entities associated with the cropped query image. In some implementations the recognition engine 250 may include one or more neural networks, e.g., one or more deep neural networks trained for image classification, and may process the received cropped query image using one of the neural networks to identify one or more entities in the cropped image.

In some implementations the recognition engine 250 can further receive data representing the received query image, e.g., photograph 100, and may process the received query image using one of the neural networks to identify one or more entities in the received query image. For example, the recognition engine 250 may use a shallower neural network, e.g., a neural network that requires less processing power, to process the query image compared to the neural network used to process the processed query image. The recognition engine 250 may combine the identified one or more entities in the cropped query image and the query image. For example, the recognition engine 250 may process the photograph 100 using a shallow neural network to identify one or more entities including "buildings," "bridge," "city" or "sky scraper." In addition, the recognition engine may process a processed query image including a cropped version of photograph 100 around the user tap location 106 using a deep neural network to identify one or more entities including "The Gherkin" or "London". As another example, the recognition engine 250 may process the processed query image using a neural network with a first number of output classes and process the received query image using a neural network with a second number of output classes, where the first number is greater than the second number. For example, continuing the example above, the second number of output classes may include entity labels such as "buildings" or "city," whereas the first number of output classes may include more specific entity labels such as "The Gherkin" or "London."

As described above, in some implementations the image processing module 240 may process a received query image by running one or more OCR engines on the query image to detect one or more areas of text in the received query image, e.g., one or more lines of text. In these cases, the recognition engine 250 may identify one or more entities associated with the processed query image by analyzing the detected text and identifying one or more entities included in the detected text.

As described above, in some implementations the image processing module 240 may process a received query image based on a user tap location by defining an area of interest around the user tap location. In these cases, the recognition engine 250 may identify one or more entities associated with the processed query image by processing the processed query image using a descriptor matching engine to identify one or more entities. For example, the system may process the processed query image using a descriptor matching engine by extracting a higher density of descriptors in the defined area of interest compared to other areas in the processed query image.

In some implementations the recognition engine 250 may identify one or more entities associated with the processed query image by processing the received query image using a first classifier to identify one or more entities in the received query image and processing the processed query image using a second classifier to identify one or more entities in the processed query image, where the second classifier has a higher processing power than the first classifier. For example, in some cases a user of a user device may provide a user tap location by accident, or may provide an incorrect user tap location by mistake. The incorrect user tap location may include a tap on or near an entity that is not of immediate interest to the user, or may include a tap that is not centered on or near a possible entity, e.g., a portion of a blue sky or a portion of a blurred background. In these cases the recognition engine may process the received query image and bias the processing of the received query image based on the processed query image, e.g., based on the user tap location, using higher processing power. The recognition engine 250 may then ensure that one or more entities are identified in the query image, even in the presence of an accidental or incorrect tap.

The recognition engine 250 may compare identified entities to terms and entities associated with a set of known entities in order to identify an expanded set of entities. For example, the recognition engine 250 may have processed a processed query image and/or a received query image to identify a set of entities "buildings," "bridge," "sky scraper," "city," "The Gherkin" or "London." The recognition engine 250 may then compare the identified entities to terms associated with the identified entities in order to identify an expanded set of entities. For example, an identified entity can include the entity "buildings" and the recognition engine 250 can identify additional terms associated with "buildings" such as "Eiffel Tower," "Empire State Building," or "Taj Mahal." As another example, the recognition engine 250 may identify the entity "The Gherkin" and can identify additional terms associated with "The Gherkin" such as "Norman foster," (architect) "Standard Life," (tenant) or "City of London" (location). In some implementations, a known set of entities or terms can be accessible to the recognition engine 250 at a database, such as a database that is associated with the recognition engine 250 or that is otherwise accessible to the recognition engine 250, e.g., over one or more networks.

In some implementations recognizing one or more entities associated with the processed query image may be performed locally at the user device, e.g., the user device 202 may include one or more recognition engines and may be configured to extract features from a given query image. For example, the user device 202 may be configured to identify one or more entities associated with the processed query image by processing the processed query image using a descriptor matching engine locally at the user device 202. In such cases the user device 202 may process a processed query image using a descriptor matching engine by extracting a higher density of descriptors in the defined area of interest compared to other areas in the processed query image, as described above.

Based on identifying one or more entities associated with the input query image and user tap location, the recognition engine 250 can transmit data that identifies the entities and, if applicable, any additional entities or terms to the query engine front-end 220 during operation (E). The recognition engine 250 can transmit the data identifying the entities to the query engine front-end 220 over one or more networks, or over one or more other wired or wireless connections.

During operation (F), the query engine front-end 220 can receive the data identifying the one or more entities, and can transmit the data identifying the entities to the knowledge engine 260. For example, the query engine front-end 220 can receive information identifying the entities "The Gherkin," "Norman foster," "Standard Life," and "City of London," and can transmit data to the knowledge engine 260 that identifies "The Gherkin," "Norman foster," "Standard Life," and "City of London." In some instances, the query engine front-end 220 can transmit the data identifying the entities to the knowledge engine 260 over one or more networks, or over one or more other wired or wireless connections.

The knowledge engine 260 can receive the data identifying the entities, and can identify information about the entities. For example, the knowledge engine can identify information that is pre-associated with the one or more entities. In some implementations, the knowledge engine 260 can identify information related to identified entities based on accessing a database or server that maintains information relating to entities. For example, the knowledge engine 260 can receive information that identifies the entity "The Gherkin," and the knowledge engine can access the database or server to identify candidate search queries that are associated with the entity "The Gherkin," such as "How tall is The Gherkin" or "Directions to The Gherkin" using a pre-computed query map. In some implementations, the database or server accessed by the knowledge engine 260 can be a database or server that is associated with the knowledge engine 260, e.g., as a part of the knowledge engine 260, or the knowledge engine 260 can access the database or server, e.g., over one or more networks. The database or server that maintains information related to entities may include information in differing languages. In such cases, the knowledge engine may be configured to identify information that is associated with a given entity in a language that matches the user's language, e.g., as indicated by the user device.

In some implementations information about the entities may include one or more candidate search queries that relate to or refer to the identified entities. For example, the database or server may include a trained or hardcoded statistical mapping of entities, e.g., based on search query logs, and can store candidate search queries that relate to various entities. The knowledge engine 260 can obtain or identify candidate search queries that are related to the one or more entities associated with the user-input query search image and user tap location using the database or server. For example, the knowledge engine 260 can identify one or more candidate search queries that are related to the building "The Gherkin" at the database or server. The knowledge engine 260 can identify the related candidate search queries based on performing a search of the database or server for candidate search queries that are related to "The Gherkin." In other implementations, the knowledge engine 250 can identify the related candidate search queries by accessing entries at the database or server that are distinctly related to the identified entity. For example, the database or server may maintain a folder or other data store that includes candidate search queries related to "The Gherkin," and the knowledge engine 260 can obtain or identify the candidate search queries related to "The Gherkin."

The knowledge engine 260 can also generate respective relevance scores for different types of information that is pre-associated with the one or more entities. For example, the knowledge engine 260 may determine whether a context of the received query image matches a candidate search query, and based on the determined match, generate a respective relevance score for the candidate search query.

In some implementations the knowledge engine 260 may define a bounding box around each identified one or more entities that are associated with a processed query image. The knowledge engine 260 may then determine that the user tap location lies within one or more bounding boxes of one or more respective entities and assign a higher relevance score to the one or more respective entities than other identified entities.

As described above with reference to operation (D), in some implementations the recognition engine 250 may combine classified entities in the processed query image with classified entities in the received query image. In these cases, the knowledge engine 260 can receive data identifying the combined entities, and can use the classified one or more entities in the received query image to contextualize the classified one or more entities in the processed query image. For example, the knowledge engine 260 may identify candidate search queries that are pre-associated with entities identified in a processed query image, e.g., the entities "Building" or "The Gherkin." In such an example, the knowledge engine 260 may generate higher respective relevance scores for candidate search queries that are related to properties of the "The Gherkin" than relevance scores for candidate search queries that are related to properties of "Building" using the entities identified in the received query image, e.g., the entity "London."

In other examples, the knowledge engine 260 may generate respective relevance scores for each of one or more candidate search queries by generating a search results page using the candidate search query and analyzing the generated search results page to determine a measure indicative of how interesting and useful the search results page is. Based on the determined measure, the knowledge engine 260 may generate a respective relevance score for the candidate search query. For example, a candidate search query that generates a search results page that includes many visual elements may be assigned a higher relevance score than a candidate search query that generates a search results page that includes less or no visual elements.

In other examples, the knowledge engine 260 may generate respective relevance scores for each of the one or more candidate search queries by determining a popularity of the candidate search query. For example, the knowledge engine 260 may generate a higher relevance score for a candidate search query that was issued more times than another candidate search query that was issued less times.

In some instances relevance scores may be assigned to information about one or more entities by another system or assigned to the information by a person, e.g., a moderator or user of the system 200.

Based on identifying the information about the one or more entities, the knowledge engine 260 can transmit data that identifies the different types and pieces of information and their respective relevance scores to the query engine front-end 220 during operation (G). For example, the knowledge engine 260 can obtain and/or identify one or more candidate search queries that are related to the building "The Gherkin," and can transmit data to the query engine front-end 220 that includes or identifies the candidate search queries "How tall is The Gherkin?" or "Directions to The Gherkin" The knowledge engine 260 can transmit the data that includes or identifies the candidate search queries to the query engine front-end 220 over one or more networks, or over one or more other wired or wireless connections.

The query engine front-end 220 can receive the data that includes or identifies the information and its respective relevance scores from the knowledge engine 260 and can select one or more representative pieces of information to provide as output in response to receiving the query image and user tap location. For example, the query engine front-end may select one or more representative search queries from the one or more candidate search queries based at least on the relevance scores, e.g., by ranking the one or more candidate search queries and selecting a number of highest scoring search queries as representative search queries. For example, the query engine front-end may receive data that includes or identifies the candidate search queries "How tall is The Gherkin?" with relevance score 0.8 and "Directions to The Gherkin" with relevance score 0.6. Based on the relevance scores, the query engine front-end may select the candidate search query "How tall is The Gherkin?"

During operation (H), the query engine front-end 220 can transmit data encoding the representative information, e.g., representative search queries, to the user device 202. In some implementations, the query engine front-end 220 can transmit data encoding the one or more representative search queries and data relating to the presentation of a search results page associated with one or more of the representative search queries, e.g., a search results page associated with the highest scoring representative search query, to the user device 202 over one or more networks, or over one or more other wired or wireless connections.

The user device 202 can receive the data encoding the representative information from the query engine front-end 220, and provide the information for output to the user 204. For example, the user device 202 may receive data encoding the ranked representative search queries "Directions to The Gherkin" "How tall is The Gherkin?" or "Who occupies The Gherkin?" and provide for output to the user 204 the one or more representative search queries and a search results page associated with the highest ranked representative search query "How tall is The Gherkin?", as depicted in FIG. 1 above.

Figure 3:
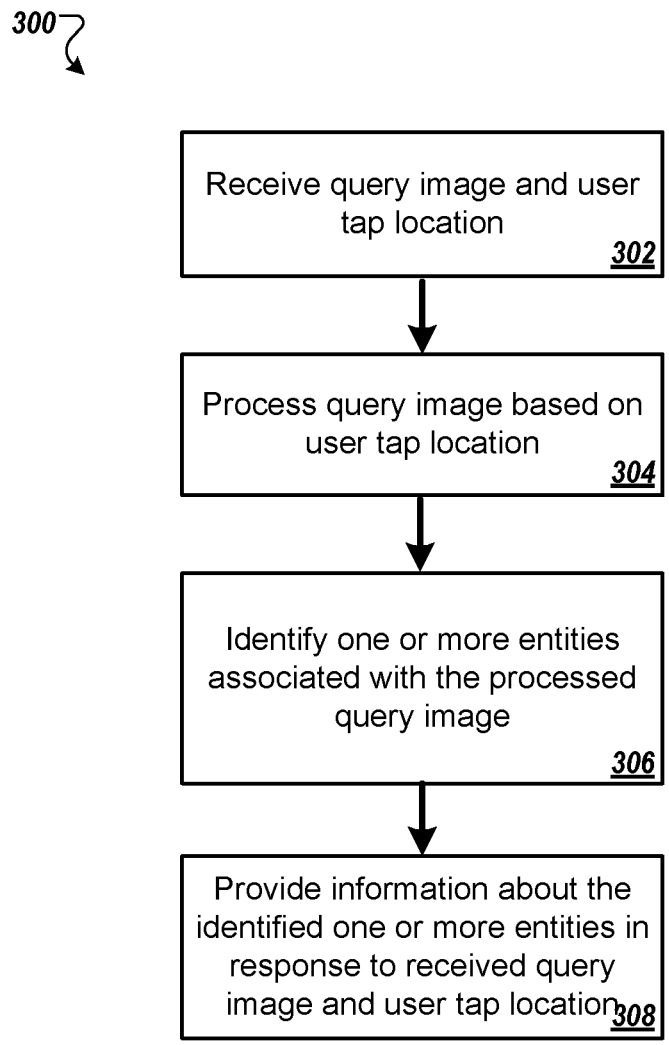
FIG. 3 depicts a flowchart of an example process for providing information about one or more entities in response to receiving a query image and a user tap location.

FIG. 3 presents an example process 300 for providing information about one or more entities in response to receiving a query image and a user tap location. For example, the process 300 can be performed by the system 200 in response to receiving a query image and user tap location by a user 204 at user device 202.

The system receives a query image and a user tap location (step 302). The query image may be a search query that is in the form of an image, for example a photo from a user's surroundings. The user tap location may be provided as a point (x,y) of the query image, or as an area of the query image, e.g., a fixed sized area of the query image.

The system processes the received query image based on the user tap location (step 304). In some implementations the system may process the received query image by cropping the received query image based on the user tap location. For example, the system may receive a query image showing a photograph of a basketball game with a user tap location on or near a basketball in play. The system may process the received query image by cropping the received query based on the tapped basketball in play. For example, the system may crop the received query image by performing a content aware cropping algorithm. As another example, the system may process the query image using an object detection neural network to generate a cropped received query image. As a further example, the system may apply a fixed size crop to the received query image around the user tap location, e.g., a fixed size crop around the basketball in play. In some implementations the system may generate multiple cropped images by cropping the query image in several places, e.g., in cases where an object detection neural network has detected multiple objects in the query image.

In some implementations the system may process the received query image based on the user tap location by processing the received query image using an optical character recognition (OCR) engines to detect one or more areas of text in the received query image. For example, the system may select an area around the user tap location, e.g., an area of fixed size, and process the selected area using a first OCR engine to identify a first number of entities. The system may further process the remaining text in the processed query image using a second OCR engine to identify a second number of entities. In some implementations processing text using the second OCR engine may be computationally less expensive than processing text using the first OCR engine.

In some implementations the system may process the received query image based on the user tap location by defining an area of interest around the user tap location. For example, the system may receive a query image showing a photograph of a basketball game with a user tap location on or near a basketball in play. The system may process the received query image by defining an area of interest around the tapped basketball in play.

The system identifies one or more entities associated with the processed query image (step 306). For example, as described above with reference to step 304, in some implementations the system may generate a processed query image by cropping the received query image based on the user tap location. In these cases, the system may identify one or more entities associated with the processed query image by processing the processed query image using a neural network, e.g., a neural network trained for image recognition as described above with reference to FIG. 2, to classify one or more entities in the processed image.

In some implementations the system may further process the received query image, i.e., the unprocessed query image, using a neural network to classify one or more entities in the received query image. The system may then combine the classified one or more entities in the processed query image and the classified one or more entities in the received query image to generate an identified set of one or more entities. In some implementations the system may combine the classified one or more entities in the processed query image and classified one or more entities in the received query image by using the classified one or more entities in the received query image to contextualize the classified one or more entities in the processed query image.

For example, the system may receive a query image showing a photograph of a basketball game and crop the image based on a user tap location centered on a basketball shown in the received query image. The system may then process the processed image using a neural network to classify one or more entities in the processed image. For example, the neural network may classify one or more entities in the processed image as a basketball. The system may further process the received query image using a neural network to classify one or more entities in the received query image and use the classified one or more entities to contextualize the classified one or more entities in the processed query image. For example, the system may classify the entities "basketball game" or "Michael Jordan" in the received query image and use these classifications to provide context to the entity "basketball," e.g., a context including basketball games or NBA league. As an alternative example, the system may receive a query image showing a photograph of the inside of a sports store, and the system may classify entities including the name of the sports store or the name of a basketball manufacturer in the received query image and use these classifications to provide context to the entity "basketball," e.g., a context including shopping.

As described above with reference to step 304, in some implementations the system may process the received query image based on the user tap location by processing the received query image using one or more OCR engines to detect one or more areas of text in the received query image. In these cases, the system may identify one or more entities associated with the processed query image by analyzing the detected text and identifying one or more entities included in the detected text. For example, the system may detect an area of text printed on a basketball shown in the processed query image, and may identify an entity associated with the processed query image as a name of the manufacturer of the basketball.

As described above with reference to step 304, in some implementations the system may process the received query image based on the user tap location by defining an area of interest around the user tap location. In these cases, the system may identify one or more entities associated with the processed query image by processing the processed query image using a descriptor matching engines to identify one or more entities. For example, the system may process the processed query image using a descriptor matching engine by extracting a higher density of descriptors in the defined area of interest compared to other areas in the processed query image.

In some implementations the system may identify one or more entities associated with the processed query image by processing the received query image using a first classifier to identify one or more entities in the received query image and processing the processed query image using a second classifier to identify one or more entities in the processed query image, where the second classifier has a higher processing power than the first classifier. For example, in some cases a user of a user device may provide a user tap location by accident, or may provide an incorrect user tap location by mistake. The incorrect user tap location may include a tap on or near an entity that is not of immediate interest to the user, or may include a tap that is not centered on or near a possible entity, e.g., a portion of a blue sky or a portion of a blurred background. In these cases the system may process the received query image and bias the processing of the received query image based on the processed query image, e.g., based on the user tap location, using higher processing power. The system may then ensure that one or more entities are identified in the query image, even in the presence of an accidental or incorrect tap.

In response to receiving the query image and the user tap location, the system provides information about the identified one or more of the entities (step 308). For example, the system may provide one or more knowledge cards relating to the identified one or more entities, a search results page relating to one or more of the identified entities, or one or more representative search queries relating to the identified one or more entities. In some implementations the system may provide information about the identified one or more entities based at least on the contextualized classified one or more entities in the processed query image, as described above with reference to step 306. For example, the system may use the contextualized classified one or more entities to generate a contextualized knowledge card, search results page or representative search query for identified one or more entities, e.g., a knowledge card or search results page relating to the NBA league as opposed to a knowledge card or search results page relating to shopping for basketballs. Providing a representative search query for output in response to receiving a query image and a user tap location is described in more detail below with reference to FIG. 4.

Figure 4:
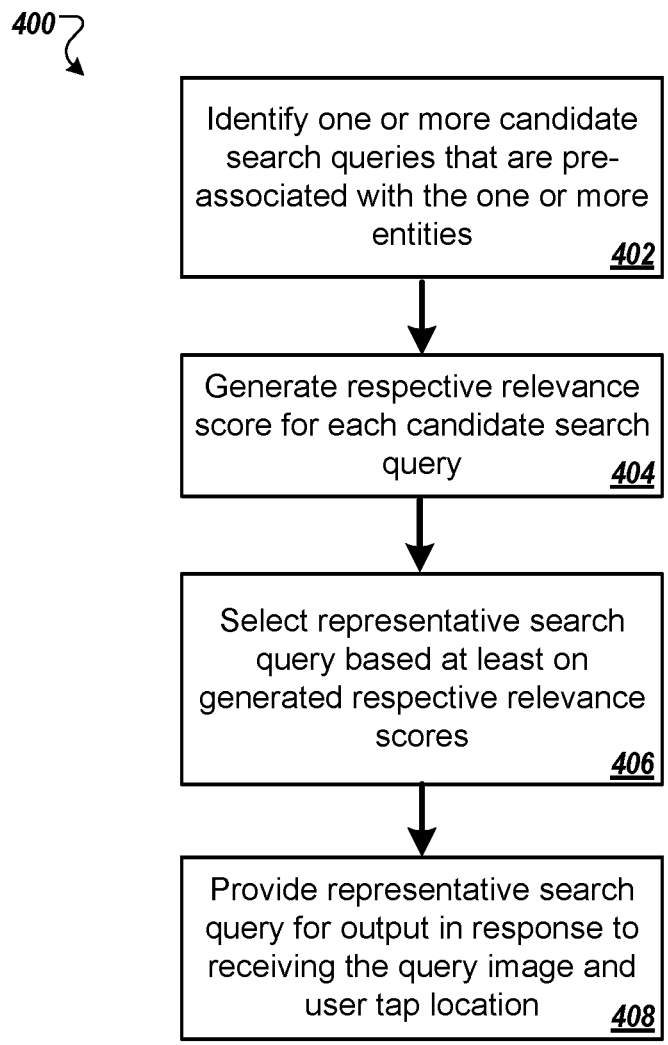
FIG. 4 depicts a flowchart of an example process for providing a representative search query for output in response to receiving a query image and user tap location.

FIG. 4 presents an example process 400 for providing a representative search query for output in response to receiving a query image and user tap location. For example, the process 400 can be performed by the system 200 in response to receiving a query image and user tap location by a user 204 at user device 202.

The system identifies, for one or more identified entities associated with a processed query image, one or more candidate search queries that are pre-associated with the one or more entities (step 402). For example, the system may access a pre-computed query map to identify one or more candidate search queries for a given entity. The pre-computed query map may be a trained or hardcoded statistical mapping of related entities, e.g., based on search query logs, and may be used to identify both entities and candidate search queries. For example, the query image may include a photo of a basketball game, and the entity "basketball" may be received as an entity associated with the query image and a corresponding user tap location. The entity "basketball" may be considered to be related to the "NBA," so both the entity "basketball" and candidate search query "NBA" may be found in the pre-computed query map.

The system generates a respective relevance score for each of the candidate search queries (step 404). In some implementations generating a respective relevance score for each of the candidate search queries may include generating a respective relevance score for each of the candidate search queries based on a proximity of the one or more entities that are pre-associated with the candidate search query to the user tap location. For example, the query image may include a photo of a basketball game with a user tap location centered on a basketball. In this example, this system may identify the entity "basketball" to be pre-associated with the candidate search query "NBA" and the entity "Michael Jordan" to be pre-associated with the candidate search query "Michael Jordan stats." The system may generate respective relevance scores for the candidate search queries "NBA" and "Michael Jordan stats" based on the proximity of the entities "basketball" and "Michael Jordan" to the user tap location. For example, the candidate search query "NBA" may be assigned a higher relevance score than the candidate search query "Michael Jordan stats" since the entity "basketball" is in closer proximity to the user tap location than the entity "Michael Jordan."

In some implementations the system may define a bounding box around each identified one or more entities that are associated with the processed query image. The system may then determine that the user tap location lies within one or more bounding boxes of one or more respective entities and assign a higher relevance score to the one or more respective entities than other identified entities. For example, the query image may include a photo of a basketball and the system may define a bounding box around each entity identified in the query image, e.g., around entities "basketball," "Michael Jordan," "Chicago Bulls", or "referee." The system may then determine that the user tap location lies within the bounding box of the entity "basketball" and assign a higher relevance score to the candidate search query "NBA" than other candidate search queries.

In some implementations each generated respective relevance score for each of the candidate search queries may be based on one or more of (i) result confidence, (ii) query popularity, or (iii) a topicality of the candidate search query. For example, the system may determine a measure of confidence that reflects a confidence that an identified entity and candidate search query accurately represent an intent of the user and generate respective relevance scores for each of the candidate search queries based on the determined measures of confidence. The system may generate a higher respective relevance score for a candidate search query that has a higher measure of confidence than a candidate search query that has a lower measure of confidence.

As another example, the system may determine a popularity of each of the candidate search queries and, based on the determined popularities, generate respective relevance scores for each of the candidate search queries. The system may generate a higher respective relevance score for a candidate search query that has been issued more times than another candidate search query that was issued less times.

As a further example, the system may determine a topicality of each of the candidate search queries and, based on the determined topicalities, generate respective relevance scores for each of the candidate search queries. The system may generate a higher respective relevance score for a candidate search query that is determined to be more topical than a candidate search query that is determined to be less topical. For example, a candidate search query relating to a current basketball season may be determined as being more topical than a candidate search query relating to a past basketball season.

As another example generating a respective relevance score for each of the candidate search queries may include, for each candidate search query, generating a search results page using the candidate search query and analyzing the generated search results page to determine a measure indicative of how interesting and useful the search results page is. Based on the determined measure, the system may generate a respective relevance score for the candidate search query. For example, the measure indicative of how interesting and useful the search results page is may depend on visual elements shown in the search results page. The system may generate higher respective relevance scores for candidate search queries that produce search results pages with oneboxes or webanswer cards than candidate search queries that produce search results pages with no oneboxes or webanswer cards.

The system selects, as a representative search query for the query image, a particular candidate search query based at least on the generated respective relevance scores (step 406). For example, the system may rank the generated relevance scores for the candidate search queries, e.g., using a ranking function or classifier, and select a particular candidate search query for the query image that corresponds to a highest ranked score.

The system provides the representative search query for output in response to receiving the query image and user tap location (step 408). In some implementations the system further generates a search results page using the representative search query and provide the generated search results page for output in response to receiving the query image. In some cases, the system may also provide a predetermined number of candidate search queries that correspond to a predetermined number of highest ranked scores for output in response to receiving the query image. For example, the system may provide the top 10 scoring candidate search queries for output in response to receiving the query image, and allow the user to select a search query of their choice.

A number of implementations have been described. Nevertheless, it will be understood that various modifications may be made without departing from the scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving (i) a query image, and (ii) a user tap location;
   processing the received query image based on the user tap location, comprising:
     using an object detection neural network to determine positions of entities depicted in the query image, the respective positions defined by a respective bounding box around each of the entities depicted in the query image; and
     identifying one of the entities depicted in the processed query image using the determined positions of the entities depicted in the query image and the user tap location; and
   in response to receiving (i) the query image, and (ii) the user tap location, providing information about the identified entity based on a proximity of the identified entity to the user tap location, comprising:
     determining that the user tap location lies within a bounding box of the identified entity depicted in the query image;
     identifying a plurality of suggested textual search queries based on determining that the user tap location lies within the bounding box of the identified entity depicted in the query image, wherein the plurality of suggested textual search queries are pre-associated with the identified entity;
     presenting the plurality of suggested textual search queries on a user device; and
     in response to a user of the user device selecting a particular suggested textual search query of the plurality of suggested textual search queries, providing search results responsive to the particular suggested textual search query.

2. The method of claim 1, wherein processing the received query image based on the user tap location comprises cropping the received query image based on the user tap location.

3. The method of claim 2, wherein cropping the received query image comprises one or more of (i) performing a content aware cropping algorithm, (ii) applying a fixed size crop around the user tap location, and (iii) applying multiple crops.

4. The method of claim 2, wherein identifying one of the entities depicted in the processed query image comprises:
   processing the processed query image using a classification neural network to classify the entities depicted in the processed query image.

5. The method of claim 4, further comprising:
   processing the received query image using the classification neural network to classify one or more entities in the received query image;
   combining the (i) classified entities in the processed query image, and (ii) the classified entities in the received query image.

6. The method of claim 5, wherein combining the (i) classified entities in the processed query image, and (ii) classified entities in the received query image comprises using the classified entities in the received query image to contextualize the classified entities in the processed query image.

7. The method of claim 1, wherein processing the received query image based on the user tap location comprises processing the received query image using an optical character recognition engine to detect one or more areas of text.

8. The method of claim 7, further comprising selecting an area around the user tap location.

9. The method of claim 8, wherein identifying one of the entities depicted in the processed query image comprises:
   processing the selected area using a first optical character recognition engine to identify a first number of entities;
   processing the remaining text in the processed query image using a second optical character recognition engine to identify a second number of entities, wherein processing text using the second optical character recognition engine is computationally less expensive than processing text using the first optical character recognition engine.

10. The method of claim 1, wherein processing the received query image based on the user tap location comprises defining an area of interest around the user tap location.

11. The method of claim 10, wherein identifying one of the entities associated with the processed query image comprises processing the processed query image using a descriptor matching engine to identify one of the entities.

12. The method of claim 11, wherein processing the processed query image using a descriptor matching engine comprises extracting a higher density of descriptors in the defined area of interest compared to other areas in the processed query image.

13. The method of claim 1, wherein identifying a plurality of suggested textual search queries comprises:
   generating a respective relevance score for a plurality of candidate textual search queries; and
   selecting the plurality of suggested textual search queries based at least on the generated respective relevance scores.

14. The method of claim 13, wherein each generated respective relevance score for each of the candidate textual search queries is based on one of (i) result confidence, (ii) query popularity, (iii) a topicality of the candidate search query, or (iv) a measure indicative of how interesting and useful a search results page associated with the candidate textual search query is.

15. The method of claim 1, wherein identifying one of the entities associated with the processed query image comprises:
processing the received query image using a first classifier to identify one or more entities in the received query image;
processing the processed query image using a second classifier to identify one or more entities in the processed query image, wherein the second classifier has a higher processing power than the first classifier.

16. A system comprising:
one or more computers comprising one or more processors, and
one or more storage devices storing instructions that are operable, when executed by the one or more computers, to cause the one or more computers to perform operations comprising:
receiving (i) a query image, and (ii) a user tap location;
processing the received query image based on the user tap location, comprising:
using an object detection neural network to determine positions of entities depicted in the query image, the respective positions defined by a respective bounding box around each of the entities depicted in the query image; and
identifying one of the entities depicted in the processed query image using the determined positions of the entities depicted in the query image and the user tap location; and
in response to receiving (i) the query image, and (ii) the user tap location, providing information about the identified entity based on a proximity of the identified entity to the user tap location, comprising:
determining that the user tap location lies within a bounding box of the identified entity depicted in the query image;
identifying a plurality of suggested textual search queries based on determining that the user tap location lies within the bounding box of the identified entity depicted in the query image, wherein the plurality of suggested textual search queries are pre-associated with the identified entity;
presenting the plurality of suggested textual search queries on a user device; and
in response to a user of the user device selecting a particular suggested textual search query of the plurality of suggested textual search queries, providing search results responsive to the particular suggested textual search query.

17. A non-transitory computer-readable storage device encoded with a computer program, the program comprising instructions that, if executed by one or more computers, cause the one or more computers to perform operations comprising:
receiving (i) a query image, and (ii) a user tap location;
processing the received query image based on the user tap location, comprising:
using an object detection neural network to determine positions of entities depicted in the query image, the respective positions defined by a respective bounding box around each of the entities depicted in the query image; and
identifying one of the entities depicted in the processed query image using the determined positions of the entities depicted in the query image and the user tap location; and
in response to receiving (i) the query image, and (ii) the user tap location, providing information about the identified entity based on a proximity of the identified entity to the user tap location, comprising:
determining that the user tap location lies within a bounding box of the identified entity depicted in the query image;
identifying a plurality of suggested textual search queries based on determining that the user tap location lies within the bounding box of the identified entity depicted in the query image, wherein the plurality of suggested textual search queries are pre-associated with the identified entity;
presenting the plurality of suggested textual search queries on a user device; and
in response to a user of the user device selecting a particular suggested textual search query of the plurality of suggested textual search queries, providing search results responsive to the particular suggested textual search query.

* * * * *

UNITED STATES PATENT AND TRADEMARK OFFICE
CERTIFICATE OF CORRECTION

PATENT NO. : 10,353,950 B2
APPLICATION NO. : 15/195369
DATED : July 16, 2019
INVENTOR(S) : Sharma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this
Twenty-eighth Day of January, 2020

Andrei Iancu
*Director of the United States Patent and Trademark Office*